United States Patent [19]

Oren, III

[11] Patent Number: 4,602,516

[45] Date of Patent: Jul. 29, 1986

[54] TRANSDUCER FOR PLANAR FORCES ON SHEET MATERIAL

[75] Inventor: Jess W. Oren, III, Washington Boro, Pa.

[73] Assignee: Armstrong World Industries, Inc., Lancaster, Pa.

[21] Appl. No.: 725,490

[22] Filed: Apr. 22, 1985

[51] Int. Cl.⁴ .............................................. G01L 5/00
[52] U.S. Cl. ................... 73/862.54; 73/862.65; 73/432 R
[58] Field of Search ................ 73/862.54, 862.65, 804, 73/818, 825, 432 J, 432 V

[56] References Cited

U.S. PATENT DOCUMENTS 3,277,704  10/1966  Eckard .............................. 73/862.65
4,016,756   4/1977  Kunkle ......................... 73/862.55 X Primary Examiner—Charles A. Ruehl

[57] ABSTRACT

A transducer to measure force in the direction of movement being applied to a segmented sheet formed from narrow pieces of lumber during the passage of the sheet through processing. The transducer is constructed of several typical pieces of wood bonded together to form a small section of the sheet. The central portion of the transducer is undercut to form a trough within which strain gauges are mounted. The undercut protects the gauges from mechanical damage by processing machinery.

4 Claims, 2 Drawing Figures

TRANSDUCER FOR PLANAR FORCES ON SHEET MATERIAL

SUMMARY OF THE INVENTION

This invention deals generally with measuring and testing and more specifically with a sensor to measure competitive force applied to a sheet along its planar direction.

One of the methods of producing wood sheet material is to use random width, narrow strips of wood and to bond many such narrow strips together along their long edges to form the sheet. The resulting product, called a "ribbon", is a continuous sheet which is composed of a series of small strips of wood.

The equipment that produces this product does so by intermittently moving the series of wood strips, which have previously been edge-coated with adhesive, through a microwave oven for heating and setting the bond. The movement is in a linear direction upon a smooth table so that the wood strips yield a smooth surface on the ribbon on that side which contacts the table. The ribbon produced is continuous and subsequently cut into appropriate widths for further use.

However, the production process has conflicting requirements. Not only must the ribbon be continuous, which requires the frequent addition of new strips to the input end of the machine and removal of finished product at the output of the machine, but the entire ribbon must be continually compressed edge to edge to assure proper bonding, and also moved in a direction which is essentially parallel to its planar surfaces.

The compression is directed so that it is between the output and input edges of the ribbon being bonded, and is produced essentially by pushing against the leading and trailing edges of the ribbon by the action of hydraulic pistons.

A mechanical problem existed in terms of maintaining this planar compression force on the product being bonded, not only while sliding the ribbon along the table, but also while adding new material at one end and cutting off the finished product at the other end.

This problem has been ingeniously solved by using clamping devices which are located between the compression pistons at either end but outside the microwave curing oven. These clamping, or holding, devices are hydraulic pistons which push platens against the top surface of the ribbon and clamp the ribbon against the table upon which it rests, preventing release of the compression force already developed. When these clamps are activated after planar compression force has been applied to the ribbon, the compression is maintained along the planar ribbon between the clamps, and then the end force pistons can be released and withdrawn to permit the addition of new unbonded strips and the cutting off of a portion of the finished product.

It is this alternate planar compression and clamping which permits the production process to be a continuous process rather than a batch process. However, the inherent problem in the alternate compression and clamping is the possibility that, for some unpredicted reason, the clamping action may not maintain continuous compression upon the ribbon, and a poor product will result because of ineffective bonding. A means for easily verifying the proper functioning of the system is therefore required.

The present invention fulfills that need without destroying actual product by either destructive testing or attachment of monitoring devices to the product.

The present invention is a transducer constructed of the same materials as the ribbon itself; narrow wood strips. The strips are assembled into a short length of sheet similar to the product itself, and the central portion of the top surface of the sheet is undercut to form a trough. On both sides of the trough, which runs transverse to the direction of ribbon motion during porcessing, are wood strips which were specifically selected to be somewhat higher than the trough and the wood strips of the transducer. Thus, the top profile of the transducer is a central trough with a raised section on either side of the trough and several other strips of varying height, but none as high as the raised sections.

Several strain gauges are mounted along the trough, with sufficient surface area to measure average compressive strain, with their active direction of measurement oriented parallel with the direction of ribbon motion, therefore making the gauges transverse to the length of the trough. Connections are made to the strain gauges by a long cable which has sufficient length to travel all the way through the microwave heating oven.

In use, the transducer is simply loaded into the ribbon in place of a portion of new material and no bonding agent is placed between the transducer and adjacent wood strips. The transducer then moves through the entire processing cycle just as if it were a section of the ribbon, but trailing its connecting cable behind it. Appropriate instrumentation attached to the cable is, therefore, able to measure compression force applied to the transducer during the entire passage through the processing cycle and to verify whether the compression force is proper for good product results.

When the transducer reaches the output region of the apparatus, since it has not been bonded to the adjacent material, it need only be disconnnected from the cable and lifted from the table. The cable can then be pulled back to the loading end of the equipment and, if desired, the test process repeated immediately.

Special considerations in the construction of the transducer involve maintaining a true planar surface on its lower surface, the surface resting on the table, and assuring that its leading and trailing edges are truly parallel. If these geometric limitations are not maintained, the compression force on the leading and trailing edge of the transducer will be modified by bowing of the transducer or by the vector relationships of the edges, and inaccurate reading will result.

With a properly constructed transducer, however, the result is an accurate, convenient and reusable means to read a parameter which was previously unattainable.

DETAILED DESCRIPTION OF THE INVENTION

Figure 1:
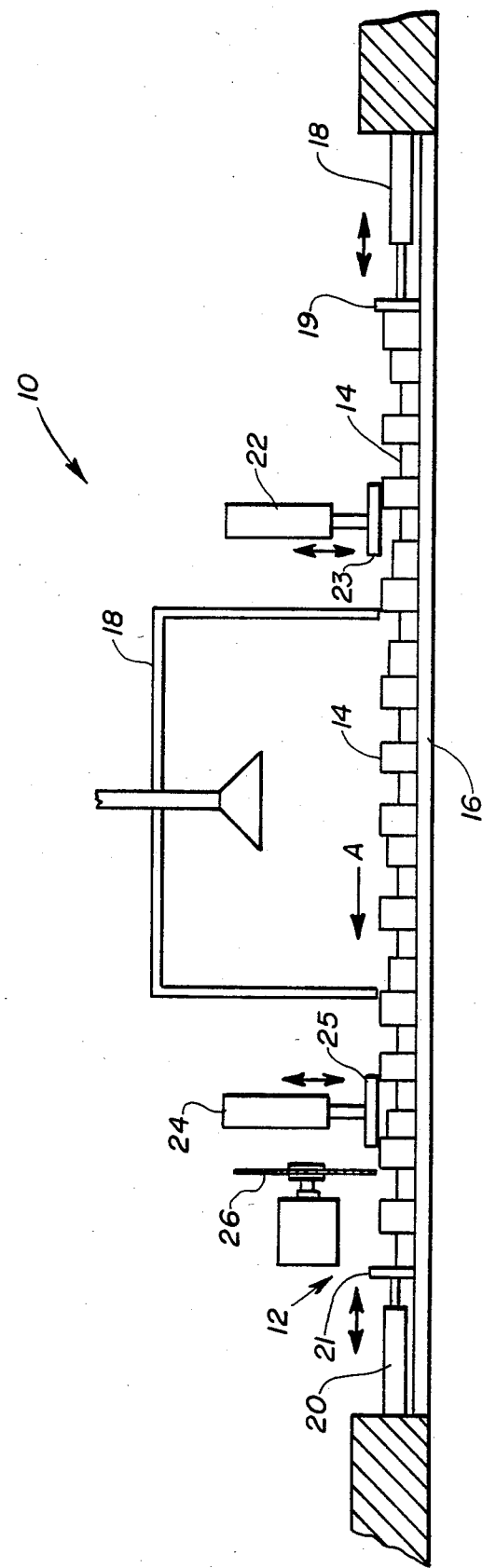
FIG. 1 is a schematic representation of the side view of the production apparatus in which the invention is used.

To better understand the benefits of the invention, a schematic representation of the side view of the production apparatus in which the invention is used is shown in FIG. 1. In production apparatus 10, wood ribbon 12 is constructed from multiple random-sized narrow wood strips 14 which are assembled with bonding material on their abutting edges. These strips are moved along base table 16 in direction A through microwave bond curing oven 18 and result in ribbon 12 with one smooth surface, that surface which was determined by and adjacent to table 16.

The process of bonding requires that ribbon 12 be subjected to compression force along the bonding edge surfaces throughout the entire processing, and this is accomplished essentially by hydraulic pistons 18 and 20 at the opposite ends of ribbon 12 as they push upon fixtures 19 and 21 respectively. Fixtures 19 and 21 apply the compression force against the two end wood strips of ribbon 12, and that force is transmitted directly by the other wood strips throughout all of ribbon 12.

If ribbon 12 were not required to be moved through microwave oven 18, for instance, if the bonding agent were air dried, nothing more would be required. However, since the production is continuous and ribbon 12 moves along table 16, the mechanism must be more elaborate. This is because, to produce continuous product, new material must be fed into the process, and finished product must be removed. In order to accomplish these actions, the movement of ribbon 12 is, first of all, intermittent, but, more important, it is necessary that end pistons 18 and 20 be temporarily released.

To do this and not lose the compression force upon ribbon 12, intermediate vertical holding pistons 22 and 24 are used to force platens 23 and 25 down upon ribbon 12 and maintain the compression force upon the region between pistons 22 and 24. After this holding action is accomplished, compression pistons 18 and 21 retract fixtures 19 and 21. This permits the addition of more wood strips between fixtures 19 and ribbon 14, and it also allows the use of saw 26 to cut off a completed section of ribbon 12 so that it can be removed.

After loading and unloading is completed, compression pistons 18 and 20 are reapplied and then, holding pistons 22 and 24 are released. Movement of ribbon 14 is then accomplished by increasing the hydraulic pressure to piston 18 until it surpasses the combined force of piston 21 and the friction force of ribbon 12 on table 16. At that point all of ribbon 12 moves in direction A as piston 20 is forced to retract and piston 18 extends. Once this movement occurs, the apparatus is once more ready to load and unload.

Figure 2:
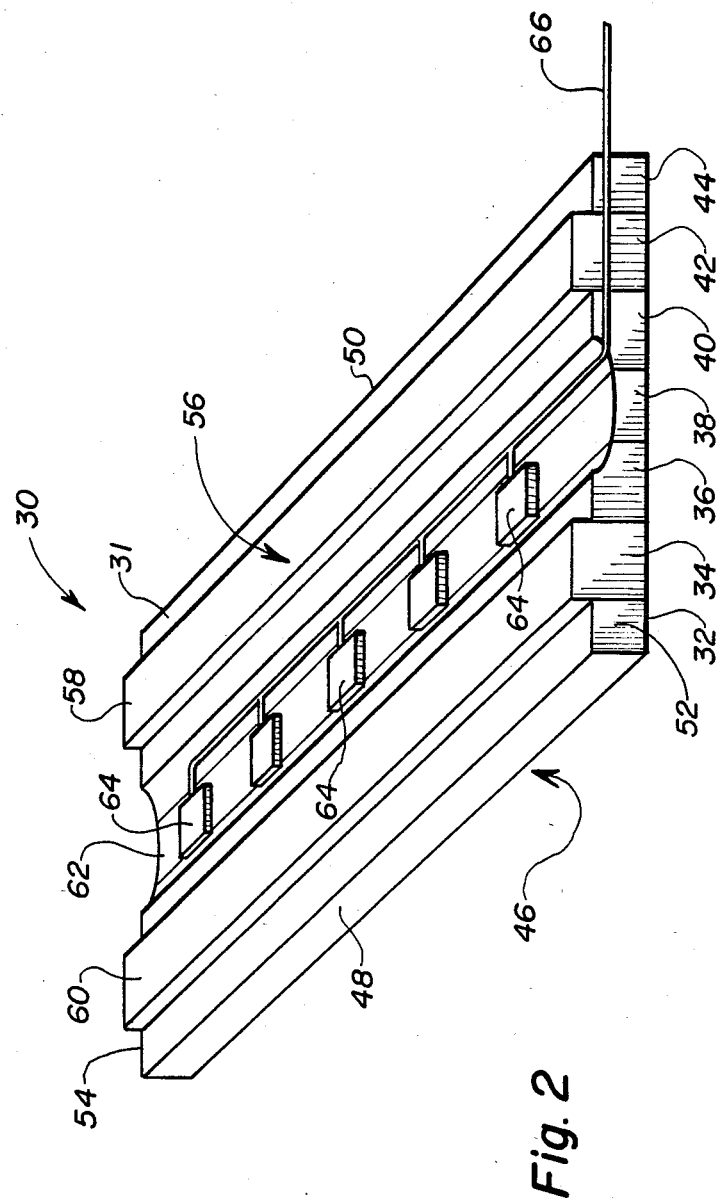
FIG. 2 is a perspective view of the preferred embodiment of the invention.

Transducer 30 of the present invention is shown in FIG. 2 and is used to verify that compression force is properly maintained on the ribbon throughout the entire production process described above. In the preferred embodiment, transducer body 31 is constructed of multiple wood strips 32, 34, 36, 38, 40, 42 and 44. However, as will be apparent from the following description, other materials can be used. The important geometric considerations for transducer body 31 are that its height approximates the height of the planar product, that lower surface 46 be a true planar surface, that its edge surfaces 48, 50, 52 and 54 be parallel to their opposite surface and perpendicular to their adjacent surfaces, and that the transducer not bow or bend when compression force is applied to edge surfaces 48 and 50. Thus, the top view of transducer 30 is a true rectangle and edges 48 and 50 are perpendicular to planar surface 46.

The multiple wood strip construction shown in the preferred embodiment of FIG. 2 meets these requirements, since the laminated construction inhibits bending and warping.

Upper surface 56 is shaped to a specific profile which includes two raised sections 58 and 60 which are higher than the rest of surface 56 and run longitudinally along the transducer, that is, essentially parallel to edges 48 and 50. Between raised sections 58 and 60 and running essentially parallel to them is undercut through 62. Upper surface 56 is therefore shaped so that machinery which presses upon it is supported by raised sections 58 and 60 and will not contact the other parts of surface 56, particularly not trough 62.

Two or more strain gauges 64, which are attached within trough 62, are therefore protected from damage. Strain gauges 64 are attached to transducer body 31 with their active measurement direction perpendicular to edge surfaces 48 and 50 and parallel to the direction of the motion of the ribbon, and each strain gauge 64 is individually connected to multiconductor cable 66 which is connected to conventional strain gauge instrumentation (not shown).

Transducer 30 is therefore able to measure compression forces applied between edge surfaces 48 and 50 and to remain undamaged when (as described in relation to FIG. 1) holding platens 23 and 25 press down upon it.

Moreover, transducer 30 can be inserted into the production apparatus 10 of FIG. 1, read compression force throughout the entire processing, and be removed after passing through the process so it can be reused.

In use, transducer 30 has demonstrated that at no time during the described process is the compression force released, and that, in fact, no compression force less than 50% of maximum exists when the apparatus is operating properly.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a commutator type connector or telemetry system could be used to connect to the transducer, rather than the umbilical cord connection shown.

What is claimed is:

1. A transducer for continuous measurement of edge compression forces applied to a planar product during processing as the product moves parallel to its planar surfaces, comprising:

a base structure with a height approximating the height of the product being processed, with one surface a true plane, with its edges forming a true plane view rectangle, with two force receiving edges which are opposite edges oriented perpendicular to the planar surface, and with the surface opposite the planar surface shaped to include two raised sections running essentially parallel to the force receiving edges and a trough between the raised sections and essentially parallel to them;

at least two strain gauges attached to the interior of the trough with their active measurement direction perpendicular to the force receiving edges; and a connecting means attached to the strain gauges for interconnection to strain gauge instrumentation means.

2. The transducer of claim 1 wherein the base structure is constructed of several strips bonded together to form the structure.

3. The transducer of claim 1 wherein the base structure is constructed of several strips bonded together and the raised sections are strips of greater height than the other strips of the structure.

4. The transducer of claim 1 wherein the connection means is a multiconductor cable.

* * * * *